United States Patent Office 3,382,187
Patented May 7, 1968

3,382,187
WET ATTRITION-RESISTANT MOLECULAR SIEVE
BODIES AND THEIR MANUFACTURE
Wilfred Drost, Williamsville, and Francis M. O'Connor, Kenmore, N.Y., assignors to Union Carbide Corporation, a corporation of New York
No Drawing. Filed Oct. 29, 1963, Ser. No. 319,678
15 Claims. (Cl. 252—455)

ABSTRACT OF THE DISCLOSURE

A method for preparing wet attrition-resistant molecular sieve bodies by contacting same with an alkali metal silicate solution for sufficient time to impart an alkali metal silicate layer thereon. The coated body is separated from the solution and contacted with at least a stoichiometric amount of an acid fluid to gel the silicate layer. The body is then fired at a temperature of at least 350° C. but below the molecular sieve crystal destruction temperature.

This invention relates to wet attrition-resistant adsorbent bodies, and more particularly relates to siliceous layered crystalline zeolitic molecular sieve bodies and to methods for manufacturing such bodies.

Molecular sieve bodies are used, for example, as desiccants in halogenated hydrocarbon refrigeration systems, the apparent pore size of the sieve being small enough to admit water into the inner adsorption region while the larger halogenated hydrocarbon refrigerant is excluded. These systems are designed to operate over extended periods of time, and may, for example, include a cartridge containing the molecular sieve adsorbent bodies. The latter are often exposed to continuous vibration as, for example, from a refrigerant compressor. This vibration may cause attrition of the adsorbent bodies and consequent formation of attrited material or "dust." Some or all of this dusted portion may discharge from the refrigerant cartridge with the circulating refrigerant.

One method of manufacturing molecular sieve agglomerates is disclosed and claimed in copending application Ser. No. 140,189 filed Sept. 25, 1961, now Patent No. 3,234,147, in the name of W. Drost et al. According to this method, a hardened molecular sieve agglomerate is prepared by providing a hydrated agglomerate and clay mineral binder, as well as an aqueous solution of an alkali metal silicate having a solids content of between about 3 percent and 35 percent by weight. The hydrated agglomerate and the aqueous solution are contacted for sufficient duration to impregnate the agglomerate with the alkali metal silicate. The impregnated agglomerate is preferably dried, and is then fired at a temperature of at least 650° F. and below that temperature at which the crystalline molecular sieve is structurally unstable so as to cure the silicate hardener.

This manufacturing method reduces the wet attrition loss of molecular sieve bodies but does not eliminate the problem. The foregoing term "wet attrition" refers to a property for which a specific test method has been devised, whereby the molecular sieve bodies are vibrated in a liquid medium and the quantity of attrited material or dust produced thereby is measured. This procedure is described in more detail below.

It is an object of this invention to provide an improved molecular sieve body which does not suffer appreciable wet attrition loss.

Another object is to provide a method for preparing such a body.

A further object is to provide a molecular sieve body having minimal wet attrition loss without sacrificing other valuable properties as a selective adsorbent, i.e., acceptable crush strength, high adsorptive capacity, and in the case of dessiccant service with halogenated hydrocarbon refrigerants, low decomposition rate of refrigerant.

These and other objects are achieved by the present invention, as will be apparent from the ensuing disclosure and appended claims.

According to one embodiment, a method is provided for preparing wet attrition resistant crystalline zeolitic molecular sieve bodies in which a zeolitic aluminosilicate body is provided and contacted with an alkali metal silicate soluton for sufficient duration to impart a silicate layer on the body. The silicate layered body is then separated from the solution and contacted with an acid fluid to gel the silicate into a siliceous layer. Thereafter the siliceous layered body is fired at temperature of at least 350° C. but below the crystal destruction temperature to dehydrate the layer and activate the body as a molecular sieve.

The term "zeolite," in general, refers to a group of naturally occurring and synthetic hydrated metal aluminosilicates, many of which are crystalline in structure. There are, however, significant differences between the various synthetic and natural materials in chemical composition, physical properties and crystal structure, the latter as evidenced by X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalline zeolitic aluminosilicate body may be employed in the present method to provide a wet-attrition-resistant zeolitic molecular sieve body according to the invention. The selection of the particular sieve will depend on factors such as the apparent pore size of the material, and the end use of the agglomerate. For example, the pores must be at least large enough to receive the desired adsorbate molecule. In the case of refrigerant drying, the pores are preferably less than about 4.9 Angstroms in diameter so as to permit the inclusion of the water molecules and exclude the larger halogenated hydrocarbon molecules.

Among the naturally occurring crystalline zeolitic molecular sieves are erionite, chabazite, analcite, faujasite, clinoptilolite and mordenite. The natural materials are adequately described in the chemical art. Synthetic zeolitic molecular sieves include zeolites A, T, X and Y.

Zeolite A is a crystalline zeolitic molecular sieve which may be represented by the formula:

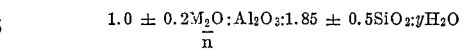

wherein M represents a metal, n is the valence of M, and y may have any value up to about 6. The as-synthesized zeolite A contains primarily sodium ions and is designated sodium zeolite A or zeolite 4A. Zeolite A is described in more detail in U.S. Patent No. 2,882,243 issued Apr. 14, 1959. Zeolite A has uniform pores of 3–5 Angstroms diameter, depending on the identity of the cation.

Zeolite T is a synthetic crystalline zeolitic molecular sieve whose molar composition may be expressed in terms of oxides as follows:

$$1.1 \pm 0.4[xNa_2O:(1-x)K_2O]:Al_2O_3:6.9 \pm 0.5SiO_2:yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952 issued Aug. 30, 1960. Zeolite T has uniform pores of about 3–4.5 Angstroms, depending on the identity of the cation.

Zeolite X is a synthetic crystalline zeolitic molecular sieve which may be represented by the formula:

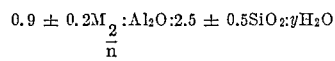

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and method for its preparation are described in detail in U.S. Patent No. 2,882,244 issued Apr. 14, 1959.

Zeolite Y is described and claimed in U.S. patent application Ser. No. 109,487 filed May 12, 1961, in the name of D. W. Breck. Zeolite Y has pores of 9–10 Angstroms size, again depending on the cation.

Clay binders are often used to agglomerate the individual molecular sieve crystals into a usable body, e.g., beads or pellets. One method of agglomeration is described in U.S. Patent No. 2,973,327 issued Feb. 28, 1961, in the name of W. J. Mitchell et al.

The clay binder should be semi-plastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, palygorskite, kaolinite, plastic ball clays, clays of the attapulgite or kaolin types, bentonite, montmorillionite, illite, chloride, and bentonite-type clay. Of these clays, the last five pass through an irreversible phase change above 700° C. which is above the temperature at which most molecular sieves lose their structural stability. Thus, if any of these five clays are to be used as binders for such molecular sieves, the bonded product is only dried and activated rather than fired so as to effect the irreversible phase change in the clay. The clay-bound molecular sieve is conventionally fired in a kiln at elevated temperatures of at least 500° C. However, the standard clay-bonded molecular sieve bodies are characterized by low attrition resistance when evaluated for refrigerant desiccant service by the "wet-attrition test" described hereinbelow.

According to this invention, any alkali metal silicate solution may be used to treat the crystalline zeolitic alumino-silicate body, as for example the sodium, lithium, potassium, rubidium and cesium forms. However, the sodium and potassium silicates are preferred, and for refrigerant drying service the latter is preferred because it provides the treated body with the unique ability to remove moisture from refrigeration systems with virtually no decomposition of the refrigerant while suffering very little loss in water adsorption capacity.

As previously indicated, the zeolitic aluminosilicate body and the alkali metal solution are first contacted for sufficient duration to impart an alkali metal silicate layer to the body. In a succeeding step the silicate-layered body is contacted with an acid fluid; the improved wet-attrition resistance exhibited by the product body is believed due to precipitation of a silica gel-type material upon acidification of the alkali metal silicate. The resultant dehydrated silica gel-containing body is more attrition-resistant than the original bonded molecular sieve, or the bonded molecular sieve product containing silicate prepared by the method of Ser. No. 140,189 referenced above.

The concentration of the alkali metal silicate solution may vary in its ratio of alkali metal oxide to silicon dioxide throughout the entire range of solubility. However, solutions containing alkali metal oxide to silicon dioxide ratios of greater than about 0.63 may cause caustic attack of the crystal structure of the molecular sieve bodies particularly at long contact times.

The degree of penetration of the alkali metal silicate solutions into the crystalline aluminosilicate body is determined by the dilution of the solution and the contact time. In general, more dilute solutions and longer contact times permit greater diffusion of the silicate into the agglomerate body. Highly viscous solutions are less satisfactory because they tend to form a relatively thick coating on the body which may chip off readily and hence give higher wet attrition losses. Representative data showing the use of several sodium silicate-water mixtures are presented in Table A below; the silicate-soaked beads were gelled with 10% $CO_2$ in air at 80° C. for two hours, followed by firing at 500° C.

In evaluating agglomerate products as treated by the method of the invention, wet-attrition losses of less than about 5%, and preferably less than about 3%, are desirable.

TABLE A

| Bead Size, Mesh | Sodium Silicate-$H_2O$ Mixture | | Wet Attrition Loss, Percent |
|---|---|---|---|
| | Wt. Percent $SiO_2$ | Viscosity, cps. | |
| 6 x 8 | 14.4 | 9 | 2.4 |
| 6 x 8 | 19.2 | 13 | 1.4 |
| 6 x 8 | 23.0 | 21 | 1.0 |
| 8 x 12 | 14.4 | 9 | 0.7 |
| 8 x 12 | 19.2 | 13 | 0.7 |

Table A indicates that different body sizes may not show the same trend in attrition resistance as a function of silicate concentration. Accordingly, one should employ the lowest viscosity silicate solution which consistently provides siliceous layered bodies of satisfactory attrition resistance; concomitantly, more favorable economics and ease of handling the bodies during the gelation step will be realized. In contacting the bodies with the alkali metal silicate treating solution, contact or soaking times of from about 10 minutes to 2.5 hours may be used. The longer soaking period of around 2 hours is preferred for thorough diffusion of the silicate solution into the body, especially where the molecular sieve body is to be used as a desiccant for halogenated hydrocarbon refrigerant streams. This silicate contacting may be accomplished in one step or in two steps; in the latter case a first gelation step with the acid fluid may be conducted between the first and second silicate contact steps.

The acid fluid for the gelation step is preferably a gas or vapor, partly because of the ease of handling and storage of gaseous gelation agents. For example, gaseous materials are usually more convenient to meter-control than liquid acids or acidic materials. They are also generally more adaptable to large-scale batch or continuous processing, as for example in a heated drum, a rotary drier or kiln to achieve the desired contact between the silicate-layered wet bodies and the gaseous gelatin agent. Also, gaseous contact systems are preferred over liquid contact systems because the former exhibit reduced toxicity and equipment corrosion problems as well as less liklihood of deleterious reaction with the molecular sieve body.

Any acid gas may be used to gel the alkali metal silicate layer into a siliceous layer, as long as the acid is available as a gas at below a temperature of about 125° C. for contact with the molecular sieve body. At higher temperatures the rate of water evaporation from the body is too rapid for satisfactory gelation. Temperatures below 100° C. are preferred to produce bodies with better wet attrition resistance than are obtained when higher temperatures are used, and a contact temperature of below about 90° C. is especially preferred to provide the optimum drying rate consistent with effective gelation of the wet silicate. If the silicate layer is allowed to dry before contact with the acid gas, or if the silicate layer dries too rapidly during contact with the gelation gas because of an excessive contact temperature, the gelled silicate product is unsatisfactory. To demonstrate this phenomenon, 6 grams of 4 x 8 mesh sodium zeolite A beads were soaked 15 minutes in a sodium silicate-water solution (10.4 wt. percent $SiO_2$), followed by drying in air at 125° C., and were then fired in a 100% $CO_2$ atmosphere for 30 minutes at 625° C. A microscopic examination of the product bodies indicated extensive surface cracking and a soft surface compared to that of products treated by the invention, and thus were deemed unsuitable for further evaluation, such as wet-attrition testing. Thus, high humidity is desirable during the gelation step. Contact temperatures as low as room temperature may be employed if longer drying times may be tolerated.

The gelling time is preferably between about 5 minutes and 2 hours, depending on the temperature. The effect of gelation conditions on the wet attrition loss of sodium zeolite A beads of 4 x 8 mesh size is demonstrated in the following Table B. The sodium silicate solution listed in this table contained 8.90 wt.-percent $Na_2O$ and 28.7 wt.-percent $SiO_2$; the potassium silicate solution contained 8.30 wt.-percent $K_2O$ and 20.80 wt.-percent $SiO_2$. Unless specified otherwise, the sodium and potassium silicate solutions used in the ensuing examples are also of these compositions.

TABLE B

| Silicate-Water Solution | Gelling Conditions | | | Firing Temp. (° C.) | Wet Attrition Loss, percent |
|---|---|---|---|---|---|
| | Percent $CO_2$ | Temp. (° C.) | Time (min.) | | |
| 50 wt. percent sodium silicate | 33 | 125 | 60 | 625 | 5.6 |
| Do | 10 | 90 | 40 | 625 | 3.9 |
| 62.4 wt. percent potassium silicate | 10 | 90 | 120 | 625 | 3.3 |
| Do | 33 | 125 | 60 | 625 | 5.3 |

Suitable acid gases include carbon dioxide, acetic acid, hydrochloric acid, sulfur dioxide and nitric oxide. The gelling reaction is between an acid and a silicate, and the gelled coating is basically a hydrated silica. Typical reactions are as follows for carbon dioxide and hydrochloric acid gases.

$$K_2SiO_3 + CO_2 + H_2O \rightarrow K_2CO_3 + SiO_2 + H_2O \quad (1)$$
$$Na_2SiO_3 + 2HCl + H_2O \rightarrow 2NaCl + H_2SiO_3 \rightarrow SiO_2 + H_2O \quad (2)$$

Carbon dioxide is preferred to the other acid gases as a gelling agent because it does not affect the aluminosilicate crystal structure if used in excess. In addition, it is non-toxic non-corrosive, low in cost and conveniently handled.

At least a stoichiometric quantity of the acid gas should be used to permit completion of the reaction. Excess quantities of acid gas are also satisfactory to insure completion, but not enough acid should be provided to permit acid attack on the binder and/or break down the aluminosilicate crystal structure. Considerable excess of a weak acid gas such as carbon dioxide may be employed without danger of this occurrence, e.g., 100 times the stoichiometric amount. On the other hand, only a small excess of a relatively strong acid gas such as hydrochloric acid could prove deleterious, e.g., about twice the stoichiometric quantity.

The concentration of the acid gas is desirably maintained above about 3%. This was demonstrated by a series of experiments in which pure $CO_2$ and $CO_2$-air mixtures were used as the acid gas atmosphere. In these tests, wet unfired "green" beads of sodium zeolite A were soaked in 50 wt.-percent sodium silicate-water mixtures or 62 wt.-percent potassium silicate-water mixtures and placed on wire screens in a one cubic-foot oven maintained at the indicated temperature. The atmosphere in the oven was controlled by varying the flow rates of $CO_2$ and air passing through the oven. The total flow rate was varied between 10 and 24 c.f.h. The results of these tests are summarized in Table C.

TABLE C

| Alkali Metal Cation Solution | Gelling Conditions | | | Firing Temp. (° C.) | Wet Attrition Loss, percent |
|---|---|---|---|---|---|
| | Percent $CO_2$ | Temp. (° C.) | Time (min.) | | |
| K | 100 | 125 | 120 | 625 | 4.0 |
| K | 33 | 125 | 60 | 625 | 4.6 |
| K | 10 | 90 | 120 | 625 | 3.3 |
| K | 10 | 90 | 120 | 500 | 3.2 |
| K | 4 | 90 | 120 | 500 | 3.6 |
| K | ᵃ 0 | 125 | 60 | 625 | 7.4 |
| Na | 10 | 90 | 120 | 500 | 1.2 |
| Na | 3 | 90 | 120 | 500 | 1.7 |
| Na | 10 | 90 | 120 | 500 | 1.4 |
| Na | 4 | 90 | 120 | 500 | 1.4 |
| None | | | | 625 | 10.1 |

ᵃ Dried in air.

These data show that gelation of the alkali metal silicate in accordance with the method of the invention provides remarkably low wet attrition loss. For example, the standard (untreated) sodium zeolite A beads fired at 625° C. showed a 10.1% loss, and the potassium silicate-treated but ungelled beads (dried in air) demonstrated a 7.4% loss. In striking contrast, a 120-minute, 10% $CO_2$ gelation step produced a loss of only 3.3%.

The data of Table C also indicate very little difference in the attrition resistance obtained at various $CO_2$ concentrations between about 3% and 100%. However, concentrations less than 3% have yielded somewhat inferior products.

Contact between the gelation gas and silicate-containing agglomerates may be achieved in any conventional manner, with the qualification that the moist bodies are not severely handled during this contact. On a batch scale, static conditions as for example where the agglomerates are spread out on trays in an oven, are suitable; for continuous or production operations, the contact step may be conducted while the beads are gently tumbled or rolled in a suitable container. The container walls are preferably lined with a lubricant such as polytetrafluoroethylene to avoid adhesion of the bodies.

In one series of experiments illustrating the suitability of this process for continuous operation, sodium zeolite A beads of 8 x 12 mesh size were immersed in a 66%-potassium silicate-aqueous solution for 2 hours, drained and then preheated to 60° C. in a closed container. Next, they were transferred to a preheated container lined with polytetrafluoroethylene and tumbled in excess $CO_2$. For tumbling times of 5 and 15 minutes the wet attrition loss was 1.4% and 1.5% respectively, as compared with a 6% loss for untreated beads.

While acid gases are preferred for use in the method of this invention, liquid-phase acid gelation may also be employed. Exemplary of the acids that are useful in liquid form are mineral acids such as hydrochloric and sulfuric and organic acids such as acetic (and halogenated derivatives thereof), lactic, formic, citric, tartaric and oxalic, and sulfamic acid. Suitable dilution, particularly in the case of the strong acids, should be maintained to minimize any deleterious reaction between the acid and the agglomerate body. Solutions of such materials as acid salts, such as sodium sulfate and chlorine are also useful as well as substances such as glyoxal and ethylene glycol which in solution exhibit acidic behavior toward alkali metal silicates.

Contact of silicate-treated agglomerates with liquid acid gelation agents may be achieved by a variety of methods. For example, the agglomerates may be immersed in acid solution in large vessels or in columns of acid-resistant construction. Acid sprayed directly onto the agglomerate has proven quite satisfactory, as has an acid sprayed directly countercurrent to silicate-wetted agglomerates dropping through a glass column.

As previously stated, it is necessary to fire the silicate-treated crystalline aluminosilicate body at a temperature of at least 500° C. to accomplish all of the following objectives, namely (a) convert the clay binder, (b) dehydrate the silica gel, and (c) activate the body as a molecular sieve. Here "activate" means driving off the water of hydration so that the inner adsorption region is vacant and the molecular sieve body contains less than about 1.5% residue water.

especially apparent in the case of extended silicate treating solution contact times. With shorter silicate treatment times a lesser degree of diffusion into the agglomerate body is discernible; a more distinct but very adherent formation of gelled silicate is observed in the region of the exterior of the agglomerate body.

Another series of tests was conducted to compare the product molecular sieve bodies of this invention with commercially available molecular sieve bodies having a coating of undetermined origin. The bodies were in the form of sodium zeolite A beads, the data being summarized in Table E. The beads prepared according to this invention were contacted with sodium silicate, gelled in a $CO_2$-air atmosphere, and fired at 500° C.

TABLE E

| Body | Mesh Size | $H_2O$ Content, g./100 g.[a] | Wet Attrition Loss (Percent dust) | Water Adsorption, 17 mm. Hg | | |
|---|---|---|---|---|---|---|
| | | | | Residual water (g./100 g.) | 40 Min. (g./100 g.) | Equilibrium (g./100 g.) |
| $CO_2$ gelled | 4 x 8 | 0 | 1.8 | 1.4 | 21.7 | 25.7 |
| Commercial | 4 x 8 | 0 | 2.8 | 0.5 | 22.6 | 27.1 |
| $CO_2$ gelled | 4 x 8 | 5 | 2.4 | | | |
| Commercial | 4 x 8 | 5 | 5.1 | | | |
| $CO_2$ gelled | 4 x 8 | 10 | 3.9 | | | |
| Commercial | 4 x 8 | 10 | 7.7 | | | |
| $CO_2$ gelled | 4 x 8 | 20 | 6.2 | | | |
| Commercial | 4 x 8 | 20 | 11.0 | | | |
| $CO_2$ gelled | 8 x 12 | 0 | 0.7 | 1.5 | 21.7 | 22.6 |
| Commercial | 8 x 12 | 0 | 2.2 | 0.5 | 23.0 | 23.7 |
| $CO_2$ gelled | 6 x 8 | 0 | 1.0 | 1.6 | 20.4 | 22.2 |
| Untreated | 4 x 8 | 0 | 10.1 | 1.0 | 21.8 | 25.9 |
| Do | 8 x 12 | 0 | 6.8 | 0.5 | 22.8 | 23.9 |
| Do | 6 x 8 | 0 | 6.0 | 1.2 | 22.5 | 26.8 |

[a] 0 = as-received with residual water.

It has been found that lower firing temperatures favor lower wet-attrition losses. Thus, in cases where the clay binder need only be dried or where the molecular sieve body contains no binder, as in preforms prepared from reactive kaolin, or where some other binder does not require the higher firing temperatures, or where the body has already been fired to set or convert the binder as may be required, a lower firing temperature to accomplish objectives (b) and (c) enumerated hereinabove may be used. Accordingly, firing temperatures as low as 350° C. may be used as demonstrated by the data of Table D, wherein 4 x 8 mesh sodium zeolite A (4A) beads were contacted with a 50% sodium silicate-water solution and then reacted with 10% $CO_2$ in air at 70–90° C.

TABLE D

| Gelling Conditions | | Firing Temp., °C. | Wet Attrition Loss, Percent |
|---|---|---|---|
| Temp., °C. | Time, min.[a] | | |
| 70–90 | 40 | 350 | 0.4 |
| 70–90 | 40 | 400 | 2.0 |
| 70–90 | 40 | 500 | 2.6 |
| 70–90 | 40 | 600 | 3.9 |

[a] Samples also dried in air oven at 125° C. for 30 minutes.

In most cases, however, the higher firing temperatures are required to maintain suitable production rates and to a low residual water concentration in the final product, in addition to objective (a) given above. Hence, firing temperatures of 500–600° C. are usually employed with quite satisfactory results.

The silica or siliceous layer produced in situ by the method of the invention is not simply a shell encasing the agglomerate and is not capable of being readily peeled off. In a preferred aspect of the invention, the alkali metal silicate apparently diffuses well into the molecular sieve body and when reacted with the inwardly digusing acid fluid, silica gel is formed therein. During the firing step this silica gel is substantially dehydrated to silica. The treated body product exhibits a hardened zone extending some distance inwardly from the exterior surface, but this zone is apparently part of the body itself. Thus, this siliceous zone is virtually non-peelable without abrading the agglomerate body itself. This diffuse zone of hardness is An inspection of Table E reveals that the novel siliceous layered molecular sieve bodies of this invention have on the order of one-half the wet attrition loss suffered by a commercially available body of similar size and water content. The water adsorption capacities and water adsorption rates are approximately the same.

A different method of contacting the alkali metal silicate-treated crystalline aluminosilicate bodies and the acid gas was used in still another series of experiments. Here, sodium zeolite A beads were first immersed in an aqueous solution of 62.4 wt. percent potassium silicate and then immersed in an undiluted solution of potassium silicate. Next, 300 cc. of the 8 x 12-mesh coated beads were tumbled in a rotating jar into which a measured amount of acetic acid vapor was distilled at either 0° C. 25° C. or room temperature. The results of these experiments are summarized in Table F.

TABLE F

| Acetic Acid wt. (gms.) | Initial Temp., °C. | Percent Wet Attrition Loss |
|---|---|---|
| 4 | 0 | 0.9 |
| 3 | 0 | 3.0 |
| 4 | 0 | 2.8 |
| 5 | 0 | 3.2 |
| 6 | 0 | 3.7 |
| 2 | 25 | |
| 3 | 25 | 4.1 |
| 4 | 25 | 3.0 |
| 5 | 25 | 3.6 |
| 6 | 25 | 3.9 |
| 5 | 0 | 1.5 |
| 8 | Room | 1.3 |
| 5 | Room | 1.6 |
| [a] | Room | 1.9 |
| None | | 6.0 |
| None | | 8.6 |

[a] 5 gms. acetic acid and 12 gms. trichloroethylene.

For purposes of comparison, Table F also shows attrition loss data for sodium zeolite A beads fired without the alkali metal silicate treatment. It can be seen from Table F that the wet attrition loss was reduced from 6.0% to as low as 0.9% by using the present invention.

In another series of tests, acid vapor was passed upwardly throught a 4-foot high, 2-inch diameter tube countercurrent to 400 cc. of falling potassium silicate-treated sodium zeolite A beads. Wet-attrition losses of from 1.0 to 2.3% were measured on the products. For example, using 20 grams of acetic acid vapor to treat the falling beads (initially at 0° C.) at a tube temperature of 90° C., a wet-attrition loss of 1.3% was obtained. It will be apparent that such values represent a substantial improvement over those for untreated beads.

In the Table A through Table F experiments and in the countercurrent acid vapor treatment described hereinabove a specific test method was used in evaluating the wet attrition resistance of the siliceous layered bodies. The test procedure is as follows: 100 ml. of the adsorbent is weighed and poured into a 4-oz. jar. Next, 50 ml. of dry trichloroethylene is added, the jar closed and the lid tightened. The jar is then placed on a pulsating mechanism having a vertical stroke of 1¾ inches and a frequency of 330 cycles per minute. The jar of desiccant is pulsated for 22½ hours (approximately 450,000 cycles) and the resulting dust is washed with the trichloroethylene through a 100-mesh screen filter into a weighed beaker. The dust is allowed to settle for about 15 minutes, followed by decanting and discarding the clear trichloroethylene. The dust-containing beaker is dried in a ventilated oven at 200–350° C. for at least 1 hour, and weighed immediately. It is important that the beaker and dust not be allowed to stand in air for longer than 15 minutes because the dust will adsorb moisture from the air.

The percent dust is calculated using the following formula:

Percent dust =

$$\frac{\text{weight of dust in beaker (in grams)} + 0.1 \text{ g.}}{\text{original weight of desiccant (in grams)}} \times 100$$

The 0.1 gram added to the weight of dust is to correct for dust adhering to the 4-oz. jar and not removed in the washing operation. Preferably, duplicate samples are run and the attrition loss expressed as the average of the two tests.

The overall method of this invention is illustrated by the following examples:

EXAMPLE 1

Sodium A zeolite "green" (i.e., unfired) beads containing 20 wt. percent attapulgus clay binder were prepared by the method described in U.S.P. 2,973,327 to Mitchell et al. These beads were then impregnated with potassium silicate by soaking in a solution of 247 lb. potassium silicate (8.30 wt. percent $K_2O$ and 20.80 wt. percent $SiO_2$) and 137 lb. $H_2O$ at room temperature for a period of 2 hours. A quantity (300 cc.) of these beads were drained and covered with a dilute potassium silicate solution containing 10.4 wt. percent $SiO_2$. The resulting treated beads, after a 15-minute soaking period, were drained on a Buchner funnel and suction-dried thereon for one minute. The beads were spread out on wire screens and placed in an oven maintained at 125° C. with an atmosphere of $CO_2$ (5 c.f.h.). After two hours the beads were transferred to large crucibles and fired in a muffle furnace for 30 minutes at 625° C., using an air purge.

Examination of product samples under a microscope showed that a hard siliceous zone had formed on the beads exhibiting good adhesion. In the wet-attrition test, an average loss of 4% was obtained.

EXAMPLE 2

One quart of 4 x 6 mesh sodium zeolite A beads prepared in the same manner as the Example 1 beads were soaked in 50 wt. percent sodium silicate solution for 15 minutes, followed by a one-minute period of draining, and suction dried. The treated beads were spread out on wire screens and placed in an oven maintained at 75–90° C., the oven atmosphere being 10% $CO_2$ in air. After two hours of gelation, the beads were transferred to large crucibles and fired in a muffle furnace for 40 minutes at 500° C. The product showed wet-attrition losses of 0.8 and 0.5% by the test method described.

EXAMPLE 3

A quantity (3000 grams) of wet (33% $H_2O$) 8 x 12-mesh sodium zeolite A beads were soaked for 2 hours in a solution of 6 lb. of potassium silicate (8.30 wt. percent $K_2O$ and 20.80 wt. percent $SiO_2$) and 3 lb. $H_2O$, drained for 20 minutes and transferred to a storage jar. From the above batch, 500 grams of wet beads (lot "A") were preheated in a sealed jar in an oven maintained at an average temperature of 50° C. The warm beads were transferred to a gas passage drum and treated for 5 minutes in an oven at 80° C. using a purge atmosphere of 15% $CO_2$ in air at 30 c.f.h. flow rate. These beads were then dipped for 10 minutes in 4/1 by weight potassium silicate-water solution, drained for 20 minutes and returned to the drum for a 15-minute treatment with 30 c.f.h. of 15% $CO_2$ in air at 80° C.

Another 500-gram lot of wet beads (lot "B") from the storage jar was dried for 15 minutes in an oven at 80° C. They were then dipped for 10 minutes in the 4/1 potassium silicate-water solution, drained for 20 minutes, and transferred to a gas passage drum. At a flow rate of 30 c.f.h., a purge atmosphere of 15% $CO_2$ in air contacted the wet beads at 80° C. for 15 minutes.

Both lots A and B were dried briefly at 80° C., tumbled for 5 minutes in air, and then fired for 40 minutes at 500° C. Samples tested by the test method described gave wet attrition losses of 1.6% for lot A and 2.8% for lot B.

EXAMPLE 4

One pint of 8 x 12-mesh clay-bonded sodium zeolite A beads were soaked for two hours in a 66% potassium silicate solution. After removing the excess solution by draining, the wet beads were preheated to 60° C. in a closed container. The warm beads were transferred to a preheated (60° C.) 1-gallon drum fitted with a smooth liner and tumbled for 15 minutes in contact with a 100% $CO_2$ atmosphere at a flow rate of 7 c.f.h. After firing of the gelled silicate-containing beads at 500° C. for 40 minutes, the wet-attrition test loss was 1.5% as compared to a typical value of around 6% loss for standard production, untreated 8 x 12 beads.

EXAMPLE 5

Preformed 4 x 8 mesh beads were agglomerated from 50 wt. percent zeolite A powder and 50 wt. percent kaolin clay powder, and converted to sodium zeolite A by digestion in a sodium hydroxide-containing aqueous reactant mixture at about 85° C. The beads (free of external binder) were then soaked for 16 hours in a 67 wt. percent potassium silicate solution at room temperature. The excess solution was removed by draining and the sample preheated to 60° C. and tumbled at this temperature in a closed Teflon-lined can filled with excess $CO_2$ for 15 minutes. The silicate-gelled beads were then dried and fired at 500° C. The wet-attrition loss of the siliceous coated beads was 1.3%.

EXAMPLE 6

A quantity (100 cc.) of sodium zeolite A green beads containing 20 wt. percent attapulgus clay binder were soaked in a 50 wt. percent sodium silicate-water solution for five minutes and then drained on a Buchner funnel with suction. The drained beads were then soaked in a 10% glyoxal solution for five minutes and drained as before, followed by drying in air at 125° C. and firing in air for 30 minutes at 625° C. The wet attrition loss by the described test method was 4.4%. This experiment illustrates the use of a liquid as the acid gelling agent for the silicate layer.

EXAMPLE 7

Another effective method for contacting the silicate-layered molecular sieve bodies with a liquid acid gelling agent is by spraying the bodies directly with the liquid. In this series of experiments, acetic acid was sprayed onto potassium silicate layered, sodium zeolite A beads at room temperature as they were tumbled in a rotating jar or as they were spread out in a screen tray. The results of these tests are tabulated in Table G.

TABLE G

| Bead Vol. cc. | Wt. Acetic Acid, gms. | Initial Bead Temp., °C. | Equip. Used for Contact | Direction spray Applied | Wet Attrition Loss, Percent |
|---|---|---|---|---|---|
| 300 | 5 | 25 | Rotating Jar | Uniform | 2.0 |
| 300 | 5 | 0 | do | do | 1.5 |
| 400 | 6 | 25 | Screen Tray | Top | 1.7 |
| 400 | 12 | 25 | do | Top and Bottom. | 1.3 |
| 400 | 12 | 25 | do | Agitated Beads. | 1.4 |

Although preferred embodiments of this invention have been described in detail, it is to be understood that obvious modifications and variations may be practiced without departing from the spirit and scope of the invention.

What is claimed is:

1. A method for preparing wet attrition-resistant crystalline zeolitic molecular sieve bodies comprising the steps of providing a crystalline zeolitic aluminosilicate body; contacting said body with an alkali metal silicate solution for sufficient duration to impart an alkali metal silicate layer on said body; separating the silicate layered body from the solution and contacting the body with an acid fluid in an amount at least sufficient to stoichiometrically react with the alkali metal of said silicate and to gel said alkali metal silicate into a siliceous layer; thereafter firing the siliceous layered body at temperature of at least 350° C. but below the crystal destruction temperature to dehydrate the layer and activate the body as a molecular sieve.

2. A method according to claim 1 in which potassium silicate is said alkali metal silicate.

3. A method according to claim 1 in which sodium silicate is said alkali metal silicate.

4. A method according to claim 1 in which sodium zeolite A is said crystalline zeolitic molecular sieve.

5. A method according to claim 1 in which said aluminosilicate body contains a clay binder.

6. A method for preparing wet attrition-resistant crystalline zeolitic molecular sieve bodies comprising the steps of providing a crystalline zeolitic aluminosilicate body; contacting said body with an alkali metal silicate solution for sufficient duration to impart an alkali metal silicate layer on said body; separating the silicate layered body from the solution and contacting the body with an acid gas at temperature below about 125° C. in an amount at least sufficient to stoichiometrically react with the alkali metal of said silicate and to gel said alkali metal silicate into a siliceous layer; htereafter firing the siliceous layered body at temperature of at least 350° C. but below the crystal destruction temperature to dehydrate the layer and activate the body as a molecular sieve.

7. A method according to claim 6 in which carbon dioxide is said acid gas.

8. A method according to claim 6 in which carbon dioxide is contacted with the silicate layered body at temperature of about 90° C. as the silicate gelling step.

9. A method for preparing wet attrition-resistant zeolite A bodies comprising the steps of providing a zeolite A body and immersing such body in a potassium silicate solution for about 2 hours to impart a silicate layer on said body; separating the silicate layered body from the solution and contacting the body with carbon dioxide at temperature of about 90° C. in an amount at least sufficient to stoichiometrically react with the alkali metal of said silicate and to gel the silicate into a siliceous layer; thereafter firing the siliceous layered zeolite A body at temperature of 500–600° C. to dehydrate the layer and activate the zeolite A body as a molecular sieve.

10. A method according to claim 1 in which acetic acid is said acid fluid.

11. A method according to claim 1 in which acetic acid liquid is said acid fluid.

12. A wet attrition-resistant, adsorbent body prepared by the steps of providing a crystalline zeolitic aluminosilicate body; contacting said body with an alkali metal silicate solution for sufficient duration to impart an alkali metal silicate layer on said body; separating the silicate layered body from the solution and contacting said layered body with an acid fluid at temperature below about 125° C. in an amount at least sufficient to stoichiometrically react with the alkali metal of said silicate and to gel said alkali metal silicate into a siliceous layer; thereafter firing the siliceous layered body at temperature of at least 350° C. but bleow the crystal destruction temperature to dehydrate the layer and activate the body as a molecular sieve.

13. An adsorbent body according to claim 12 in which potassium silicate is said alkali metal silicate, carbon dioxide gas is said acid fluid, and sodium zeolite A is said molecular sieve.

14. A wet-attrition-resistant, adsorbent body prepared by the steps of providing a zeolite A body; contacting said body with an alkali metal silicate solution for sufficient duration to impart an alkali metal silicate layer on said body; separating the silicate layered body from the solution and contacting the body with an acid gas at temperature below about 125° C. in an amount at least sufficient to stoichiometrically react with the alkali metal of said silicate and to gel said alkali metal silicate into a siliceous layer; thereafter firing the siliceous layered body at temperature of 500–600° C. to dehydrate the layer and activate the body as a molecular sieve.

15. A wet attrition-resistant, adsorbent body prepared by the steps of providing a zeolite A body; immersing said body in a potassium silicate solution for about 2 hours to impart a silicate layer on said body; separating the silicate layered body from the solution and contacting the body with carbon dioxide at temperature of about 90° C. in an amount at least sufficient to stoichiometrically react with the alkali metal of said silicate and to gel the silicate into a siliceous layer; thereafter firing the siliceous layered zeolite A body at temperature of 500–600° C. to dehydrate the layer and activate the zeolite A body as a molecular sieve.

References Cited

UNITED STATES PATENTS

| | | | |
|---|---|---|---|
| 3,207,701 | 9/1965 | Curtin | 252—455 |
| 3,234,147 | 2/1966 | Drost et al. | 252—455 |
| 3,238,147 | 3/1966 | Cramer et al. | 252—455 |
| 3,262,890 | 7/1966 | Mitchell et al. | 252—455 |

DANIEL E. WYMAN, *Primary Examiner.*

C. F. DEES, *Assistant Examiner.*